Figure 1:
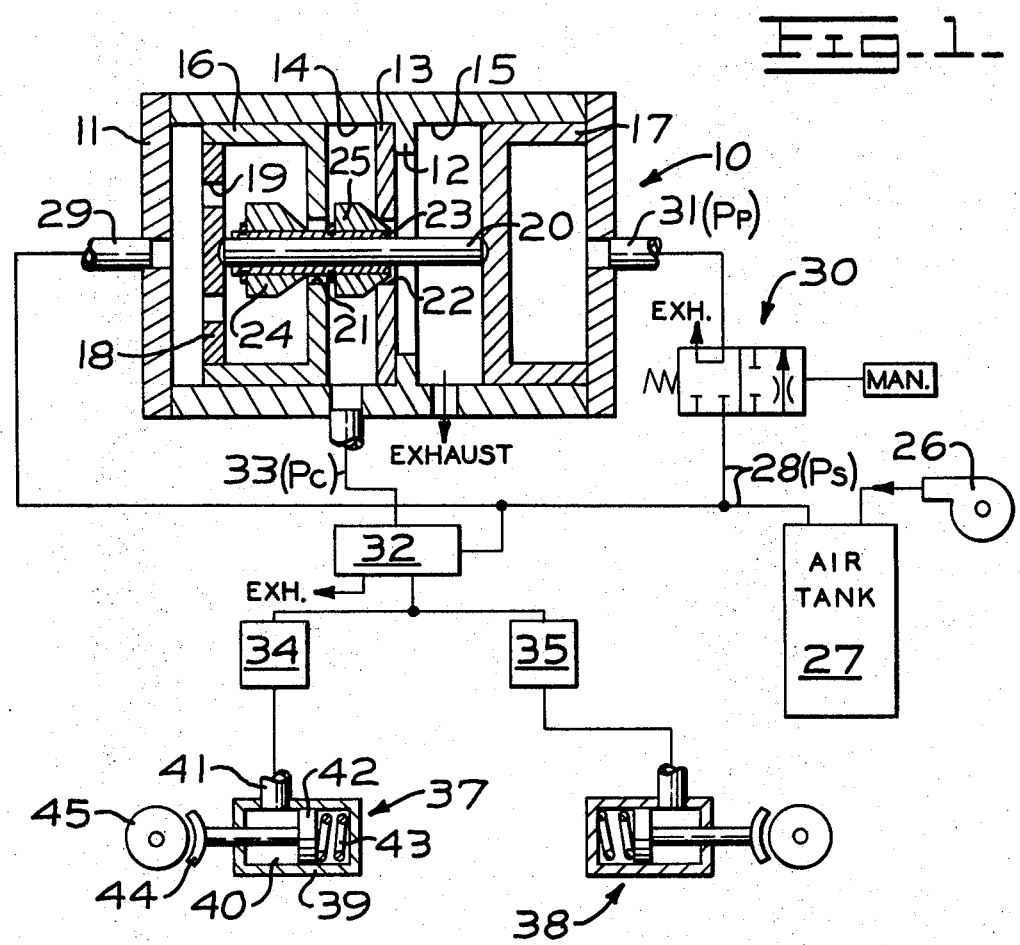

United States Patent

[11] 3,539,228

| [72] | Inventor | Donald L. Smith |
| | | Peoria, Illinois |
| [21] | Appl. No. | 769,482 |
| [22] | Filed | Oct. 22, 1968 |
| [45] | Patented | Nov. 10, 1970 |
| [73] | Assignee | Caterpillar Tractor Co. |
| | | Peoria, Illinois |
| | | a corporation of California |

[54] PRESSURE CONTROL VALVE
6 Claims, 2 Drawing Figs.

[52] U.S. Cl.................................................. 303/40,
137/596.18, 137/625.27; 303/6, 303/68
[51] Int. Cl....................................................... B60t 8/26,
B60t 15/00
[50] Field of Search............................................ 137/627.5,
625.66, 625.27, 596.18; 303/40, 68—69, 6, 48

[56] References Cited
UNITED STATES PATENTS

| 3,125,379 | 3/1964 | Valentine..................... | 303/40X |
| 3,270,774 | 9/1966 | Stuart........................... | 137/596.18 |
| 3,359,043 | 12/1967 | Papin............................ | 137/627.5X |

*Primary Examiner*—Milton Buchler
*Assistant Examiner*—John J. McLaughlin
*Attorney*—Fryer, Tjensvold, Feix, Phillips and Lempio ABSTRACT: A pressure control valve of the inverter type is employed in a hydropneumatic braking circuit and comprises spaced pistons reciprocally mounted therein and connected together by a rod for simultaneous movement. Selective pneumatic actuation of the pistons sequentially opens and closes spaced poppet valve members, slidably mounted on the rod, for engaging a normally disengaged hydraulic brake or the like.

INVENTORS
DONALD L. SMITH

BY
*[signature]*
ATTORNEYS

PRESSURE CONTROL VALVE

Numerous valves have been proposed for controlling pressurized fluid flow to an actuated device such as an automotive brake. Many such valves employ means for effecting a pilot pressure to selectively actuate the valve to communicate a pressurized fluid source to the brake. Conventional valves are oftentimes complex, costly and do not always assure efficient operation over extended periods of time. Such problems are particularly apparent with respect to flow control valves of the invertor type which function to normally communicate full line pressure to the brake to maintain it in a disengaged condition of operation.

An object of this invention is to provide a noncomplex and low-cost pressure-inverting control valve which exhibits a high degree of structural integrity for assuring efficient operation and long service life. Such valve is particularly adapted for use as an invertor valve in a hydropneumatic circuit to normally pressurize a chamber of a hydraulic brake or the like to normally maintain it in a disengaged condition of operation. Selective actuation of the valve functions to exhaust such brake chamber to permit brake engagement.

The pressure control may comprise a rod having at least one valve member slidably mounted thereon to cooperate with a seating means to form a poppet valve for controlling fluid flow thereby. Pilot pressure control means are operatively associated with the rod to control relative opening and closing movements of the valve member and seating means. In the preferred embodiment hereinafter described, two such poppet valves are employed and two pistons are reciprocally mounted in the valve to define four consecutive and cooperating chamber means.

Figure 2:
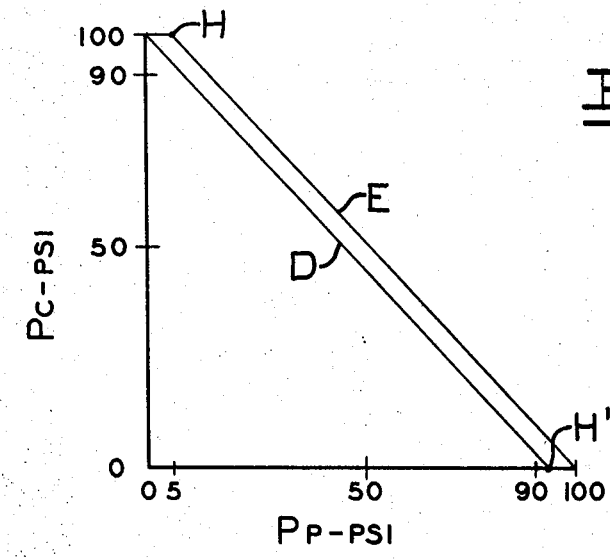

Other objects of this invention will become apparent from the following description and accompanying drawings wherein:

FIG. 1 schematically illustrates a hydropneumatic braking circuit employing the pressure-inverting control valve of this invention therein with the valve shown in cross section; and FIG. 2 graphically illustrates operational pressure curves for the circuit of FIG. 1.

FIG. 1 illustrates a preferred pressure-inverting control valve embodiment 10 employed as an invertor valve in a hydropneumatic braking circuit for a ground engaging vehicle or the like. It should be understood that the pressure-inverting control valve principles and features herein described are adapted for other suitable applications well known in the art. For example, the valve teachings may be utilized for the actuation of power tools or other devices which require controlled pneumatic or hydraulic operation.

The valve comprises a housing 11 having a circular flange 12 and baffle plate 13 secured in a chamber therein. The baffle and flange thus aid in defining spaced chamber portions 14 and 15 reciprocally mounting pistons 16 and 17, respectively, therein. Thus, piston 16, chamber portions 14 and 15 and piston 17 provide four consecutive chamber means for purposes hereinafter explained.

Piston 16 has a plate 18 secured thereto, located in the first or main chamber means and having a plurality of radially disposed apertures 19 formed therethrough. A rod 20 is centrally disposed in the housing and is preferably attached to pistons 16 and 17 to effect simultaneous movement thereof when one of the pistons is moved axially. The rod extends through valve seats or seating means 21 and 22 formed in piston 16 and plate 13, respectively.

A sleeve 23 is slidably mounted on the rod and has spaced first and second valve members 24 and 25, preferably poppets, suitably secured thereto with the second poppet located in the second or control chamber means. When the circuit is maintained in its normal, FIG. 1 condition of operation the conically shaped seating portion of poppet 25 will engage seat 22 whereas poppet 24 will be separated from seat 21. Since sleeve 23 is prevented from moving further rightwardly by baffle plate 13, it can be seen that piston 16 must be moved leftwardly to engage seat 21 with poppet 24.

The circuit may further comprise a conventional air compressor 26 adapted to charge an air tank 27 with supply pressure ($P_S$) maintained at 100 p.s.i., for example. A line 28 normally communicates with supply pressure to an inlet 29 communicating with the first chamber means of valve 10 to urge piston 16 rightwardly. A manually actuated directional control valve or pilot pressure control means 30, shown in its blocking or "brake-off" position, may be selectively actuated to communicate a variably controlled pilot pressure ($P_P$) to an inlet 31. Thus, the pilot pressure in the fourth or pilot chamber means may be selectively varied by the directional control valve to precisely control the position of pilot piston 17 in the pressure-inverting control valve.

The 100 p.s.i. supply pressure further communicates with a conventional relay valve 32 operatively connected to an outlet 33 of the pressure control valve to receive a control pressure ($P_C$) therefrom. The relay valve functions in a conventional manner to control the desired pressure level in a pair of pneumatically actuated devices 34 and 35 preferably of the rotochamber - master cylinder type. Upon selective actuation of the latter two devices, hydraulic fluid is communicated to identical brake assemblies 37 and 38.

Schematically illustrated brake assembly 37, for example, comprises a housing 39 forming a closed chamber 40 therein having an inlet 41 operatively connected to device 34. In the illustrated "brake-off" condition of operation, supply pressure ($P_S$) substantially equals control pressure ($P_C$) and communicates through line 28 and valves 10 and 32 to actuate the devices 34 and 35. Such actuation functions to pressurize chamber 40 to retract a piston 42 against the opposing force of a spring means 43. The piston's rod is connected to a brakeshoe 44 which is thus maintained out of engagement with a brakedrum 45.

During the "brake-off" condition of operation, supply pressure ($P_S$) functions to maintain pistons 16 and 17 in their full rightward position since pilot pressure ($P_P$) in the fourth chamber means at inlet 31 is exhausted via valve 30. The effective or differential area of the poppet valve assembly, comprising poppets 24 and 25 and attached sleeve 23, enables the supply pressure to move the assembly fully rightwardly to close poppet 25 on seat 22. Third or exhaust chamber means 15 communicates with exhaust to permit such seating relationship.

When the operator moves the spool of directional control valve 30 leftwardly to communicate an apportioned amount of supply pressure to the fourth of pilot chamber means, brake pads 44 will engage their respective drums in direct proportion to the amount of movement of such valve spool. It should be understood that valve 30 may be manually actuated either by hand or foot or may be automatically actuated in response to an appropriate control signal if so desired. An increase in the pressure level in the fourth chamber means, formed in part by piston 17, will function to move the piston leftwardly. Such movement will in turn shift mechanically connected rod 20 and piston 16 leftwardly until seat 21 engages the conically shaped seating portion of poppet 24.

Supply pressure is now cut off from outlet 33, but third chamber means 15 will not exhaust until a sufficient leftwardly directed transferring force is applied against the poppet assembly by the seat 21 of piston 16 to overcome the rightwardly directed reaction force on the assembly. Such transferring force may be effected by a 5 p.s.i. pilot pressure, for example, initiated in the fourth chamber means. Such initial pilot pressure represents the pressure hysteresis depicted by the abscissa of point H on brake engagement curve E in FIG. 2.

Once poppet 24 is supported on seat 21 the pistons, rod and poppet assembly will move leftwardly in unison in response to a further increase in the pilot pressure. Such increase over 5 p.s.i. causes poppet 25 to unseat and allow the exhaust of control pressure from second chamber means 14 to third chamber means 15. The control pressure lessens until the combined leftwardly directed forces created by the pilot pressure acting on piston 17 and by the control pressure acting on the right side of piston 16 again equal the substantially constant force provided by the supply pressure in the first chamber means. As the operator continues to increase pilot pressure at inlet 31 a proportional drop in control pressure will result until the 100 p.s.i. supply pressure is balanced fully by 100 p.s.i. pilot pressure as depicted by the intersection of curve A with the axis of abscissa in FIG. 2.

When the operator returns valve 30 towards its normal FIG. 1 position to decrease the pilot pressure, pistons and rod will move rightwardly to cause the poppet assembly to be supported at exhaust seat 22 rather than supply seat 21. Thus, the reaction force on the poppet assembly will be effectively and expeditiously transferred back to the exhaust seat. Such change preferably requires a drop of 5 p.s.i. (to 95 p.s.i.) in the pilot pressure, represented by the pressure hysteresis depicted by the abscissa of point H' on brake disengagement curve D in FIG. 2.

Further reduction in pilot pressure will allow the pistons and interconnecting rod to shift further to the right to at least partially open outlet 33 to the supply pressure when seat 21 moves away from poppet 24. The control pressure again rises until the forces on the pistons and rod are balanced and supply seat 21 again contacts poppet 24 to close such supply to second chamber means 14. A proportional increase in control pressure will result with each increment of decreased pilot pressure until the control pressure equals the supply pressure as reflected by the intersection of brake disengagement curve D with the axis of ordinate. At such time the pilot pressure will equal zero and the pistons and rod will again assume the "brake-off" positions illustrated in FIG. 1.

I claim:

1. A pressure-inverting control valve comprising:
   a first chamber means having an inlet for communicating a pressurized fluid therein;
   a second chamber means having an outlet adapted to communicate with a pressure-actuated device;
   a pilot chamber means having an inlet for communicating a variably controlled pilot fluid pressure therein; and
   control means for communicating pressurized fluid from said first chamber means to said second chamber means so that the level of fluid pressure in said second chamber means is maintained inversely proportional to the level of the varied pilot fluid pressure maintained to said pilot chamber means.

2. The invention of claim 1 wherein said pressure-inverting control valve further comprises a housing, and said control means comprises:
   a rod mounted for reciprocal movements in said housing;
   at least one valve member reciprocally mounted on said rod; and
   seating means positioned between said first and second chamber means and operatively associated with said valve member for preventing fluid flow thereby when said valve member is seated thereon.

3. The invention of claim 2 wherein said control means further comprises a second valve member slidably mounted on said rod and a second seating means operatively associated with said second valve member, said valve members attached together for simultaneous reciprocal movement on said rod.

4. The invention of claim 2 wherein said control means further comprises at least one piston reciprocally mounted in said first chamber means of said housing, said seating means formed through said piston, said rod engaging said piston to move said seating means into engagement with said valve member when said rod is moved in one direction in said housing.

5. The invention of claim 4 wherein said control means further comprises a second piston reciprocally mounted in said second chamber means of said housing, said rod further engaging said second piston for simultaneous movement with both of said pistons, said first piston separating said first and second chamber means and said second piston defining said pilot chamber means with said housing.

6. The invention of claim 5 further comprising a baffle plate attached to said housing between said pistons, a second seating means formed through said baffle plate and a second valve member slidably mounted on said rod and attached to said first valve member for simultaneous reciprocal movement therewith.